United States Patent
Madasu et al.

(10) Patent No.: US 9,367,653 B2
(45) Date of Patent: Jun. 14, 2016

(54) PROPPANT TRANSPORT MODEL FOR WELL SYSTEM FLUID FLOW SIMULATIONS

(71) Applicant: Halliburton Energy Services, Inc., Houston, TX (US)

(72) Inventors: Srinath Madasu, Houston, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 158 days.

(21) Appl. No.: 14/144,084

(22) Filed: Dec. 30, 2013

(65) Prior Publication Data

US 2015/0066455 A1    Mar. 5, 2015

Related U.S. Application Data (60) Provisional application No. 61/870,644, filed on Aug. 27, 2013.

(51) Int. Cl.
| | |
|---|---|
| *G06F 17/50* | (2006.01) |
| *E21B 43/00* | (2006.01) |
| *E21B 43/267* | (2006.01) |
| *E21B 21/08* | (2006.01) |

(52) U.S. Cl.
CPC .......... *G06F 17/5018* (2013.01); *E21B 43/267* (2013.01); *E21B 21/08* (2013.01); *G06F 2217/16* (2013.01)

(58) Field of Classification Search
CPC .................................................... E21B 43/267
See application file for complete search history.

(56) References Cited

U.S. PATENT DOCUMENTS

| | | | | |
|---|---|---|---|---|
| 5,408,638 | A * | 4/1995 | Sagawa et al. | 703/2 |
| 6,863,128 | B2 * | 3/2005 | Pandey | E21B 43/267 |
| | | | | 166/250.07 |
| 7,925,482 | B2 | 4/2011 | Kennon et al. | |
| 2002/0177986 | A1 * | 11/2002 | Moeckel et al. | 703/9 |
| 2003/0060988 | A1 * | 3/2003 | Ginzburg | 702/50 |
| 2007/0137859 | A1 * | 6/2007 | Abass et al. | 166/250.1 |
| 2008/0149329 | A1 | 6/2008 | Cooper et al. | |
| 2008/0164021 | A1 | 7/2008 | Dykstra | |

(Continued)

FOREIGN PATENT DOCUMENTS

CN           101684727          6/2013

OTHER PUBLICATIONS

"Sand Deposition Inside a Horizontal Well—A Simulation Approach" by Q. Doan et al. (pp. 1-13; 1998), Provided on PTO 1449 dated Oct. 7, 2014 reference 18.*

(Continued)

*Primary Examiner* — Akash Saxena

(74) *Attorney, Agent, or Firm* — Holly Soehnge; Fish & Richardson P.C.

(57) ABSTRACT

In some aspects, a one-dimensional proppant transport flow model represents flow of a proppant-fluid mixture in a subterranean region. The one-dimensional proppant transport flow model includes a proppant momentum conservation model that balances axial proppant momentum in an axial flow direction of the proppant-fluid mixture against dynamic changes in transverse proppant momentum. In some instances, the proppant momentum conservation model can vary the axial proppant momentum, for example, to account for interphase momentum transfer between the proppant and the fluid.

19 Claims, 4 Drawing Sheets

(56) References Cited

U.S. PATENT DOCUMENTS

| | | | | |
|---|---|---|---|---|
| 2008/0190603 | A1* | 8/2008 | Brannon | 166/250.1 |
| 2009/0145599 | A1* | 6/2009 | Siebrits et al. | 166/250.1 |
| 2009/0308601 | A1* | 12/2009 | Poe et al. | 166/250.01 |
| 2010/0082258 | A1* | 4/2010 | Wang | 702/12 |
| 2010/0185420 | A1* | 7/2010 | Ding | 703/2 |
| 2011/0040485 | A1* | 2/2011 | Ong | 702/12 |
| 2011/0257944 | A1* | 10/2011 | Du et al. | 703/2 |
| 2012/0241152 | A1* | 9/2012 | Brannon | 166/280.2 |
| 2012/0245903 | A1* | 9/2012 | Sturdza et al. | 703/2 |
| 2013/0066617 | A1 | 3/2013 | Weng et al. | |
| 2013/0079935 | A1* | 3/2013 | Kabannik et al. | 700/282 |
| 2014/0151033 | A1* | 6/2014 | Xu | 166/250.01 |
| 2015/0025858 | A1* | 1/2015 | Kulkarni | E21B 43/26 703/2 |
| 2015/0032425 | A1* | 1/2015 | Kulkarni et al. | 703/2 |
| 2015/0066446 | A1* | 3/2015 | Lin et al. | 703/2 |
| 2015/0066455 | A1* | 3/2015 | Madasu et al. | 703/2 |
| 2015/0083404 | A1* | 3/2015 | Wilt et al. | 166/250.1 |

OTHER PUBLICATIONS

Theory of Sand Transport in Thin Fluids by M.A. Biot et al; p. 1-24, SPE 1985.*

Mfrac—3D Hydraulic Fracturing Simulator, Baker Hughes, copyright 1983-2013, accessed online Jul. 2013 at www.mfrac.com/mfrac.html, 2 pages.

Lin et al, U.S. Appl. No. 14/011,349, filed Aug. 27, 2013, entitled "Connection Conditions for Modeling Fluid Transport in a Well System Environment", 40 pages.

Halliburton, "Fracturing Treatment Optimization Through Integrated Monitoring and Analysis," Pinnacle Fracture Monitoring, Fiber Optic Distributed Temperature Sensing and Microseismic Mapping Technologies, Halliburton, HO8384, May 2011, 3 pages.

"Meyer Fracturing Simulators," Meyer & Associates, Inc. User's Guide, Ninth Edition, copyright 2011, 1022 pages.

"Eclipse 2010 Reservoir Engineering Software," Schlumberger Solves reservoir engineering challenges, 10-IS-0426, 2010, 4 pages.

Li et al, "Numerical Modelling of Cuttings Transport in Horizontal Wells Using Conventional Drilling Fluids", JCPT—Technical Note, vol. 46, No. 7, Jul. 2007, pp. 9-15.

Fulton et al., "Front End Engineering Studies for Carbonate Stimulation Optimization", IPTC 10697, Nov. 21-23, 2005, 11 pages.

Buijse et al., "A Semiempirical Model to Calculate Wormhole Growth in Carbonate Acidizing", SPE 96892, Oct. 9-12, 2005, 14 pages.

Glasbergen et al., "Field Validation of Acidizing Wormhole Models", SPE 94695, May 25-27, 2005, 11 pages.

Pongratz et al.,"Optimizing Matrix Stimulation Treatments in a Multilayered Reservoir in Russia by Applying Different Diversion Techniques", SPE 94485, May 25-27, 2005, 15 pages.

Stevenson et al., "Structured Approach to Matrix Stimulation Proves Successful in Oman" SPE 82261, May 13-14, 2003, 10 pages.

Nitters et al., "Structured Approach to Advanced Candidate Selection and Treatment Design of Stimulation Treatments", SPE 63179, Oct. 1-4, 2000, 8 pages.

Jones et al., "Quantifying Acid Placement: The Key to Understanding Damage Removal in Horizontal Wells", SPE 50975, Aug. 1998, 7 pages.

Doan et al., "Sand Deposition Inside a Horizontal Well—A Simulation Approach", The Petroleum Society, Paper 98-65, Jun. 1998, 13 pages.

Doan et al., "Flow of Oil and Sand in a Horizontal Well", JCPT, vol. 37, No. 10, Oct. 1998, 7 pages.

Doan et al., "Simulation of Sand Transport in a Horizontal Well", SPE 37106, Nov. 18-20, 1996, 13 pages.

Alves et al., "A Unified Model for Predicting Flowing Temperature Distribution in Wellbores and Pipelines", SPE Production Engineering, Nov. 1992, 5 pages.

Authorized Officer, Hyun Goo Choi, PCT International Search Report and Written Opinion of the International Searching Authority, PCT/US2014/052994, Dec. 2, 2014, 10 pages.

Halliburton, "INSITE for Stimulation Version 2.4.0P1 Software User's Manual for TCC 3000 and 5000 Data-Acquisition Systems," Part No. 101280731, dated Feb. 2007, 594 pages.

Halliburton, "INSITE for Well Intervention V1.0.1 Software User's Manual," Part No. 101551873, dated Feb. 2006, 733 pages.

PCT International Preliminary Report on Patentability, PCT/US2014/052994, Mar. 10, 2016, 7 pages.

* cited by examiner

PROPPANT TRANSPORT MODEL FOR WELL SYSTEM FLUID FLOW SIMULATIONS

CROSS-REFERENCE TO RELATED APPLICATIONS

This application claims the benefit of priority to U.S. Provisional Application Ser. No. 61/870,644, entitled "Modeling Proppant Flow and Fluid Displacement in a Well System Environment," filed on Aug. 27, 2013. The entire contents of the priority application is hereby incorporated by reference.

BACKGROUND

The following description relates to simulating proppant transport in a fluid flow model, for example, in a simulation of well system fluid in a subterranean region.

Flow models have been used to simulate fluid flow in hydraulic fracture treatments and other environments. During a conventional fracture treatment of a subterranean reservoir, pressurized fluid is communicated from a wellbore into the reservoir at high pressure, and the pressurized fluid propagates fractures within the reservoir rock. In some cases, the pressurized fluid includes proppant material. Flow models can be used to simulate the flow of the proppant, for example, within a fracture network.

DESCRIPTION OF DRAWINGS

Like reference symbols in the various drawings indicate like elements.

DETAILED DESCRIPTION

Fluid flow models can be used to analyze fluid flow, for example, in a well system environment (e.g., in a wellbore, a fracture network, within the reservoir rock matrix, in a well system tool, etc.) or other environments. In some environments, the fluid flow is unsteady and multi-dimensional (e.g., three-dimensional or at least two-dimensional). For example, in some types of fractures, the dominant flow is two-dimensional, and includes transient behaviors. In some instances, two- or three-dimensional flow can be described by a one-dimensional flow model, for example, by integrating the governing flow equations over the cross-section of the two- or three-dimensional flow path. In some cases, the resulting equations include nonlinear partial differential equations that can be solved using finite difference, finite volume, or finite element methods. In some cases, the use of one-dimensional flow models can reduce computational costs, and allow for faster or more computationally efficient simulations. In some instances, a flow model can be used to perform numerical simulations in real time, for example, during a fracture treatment or during another well system activity.

In some cases, a fluid flow model models the flow of fluid in a fracture, for example, during a hydraulic fracturing treatment or another type of injection treatment. As another example, a fluid flow model can model the flow and distribution of proppant in a fracture. Typically, the proppant is a collection of solid particles that are injected into the subterranean formation, such that the solid particles hold (or "prop") open the fractures generated during a hydraulic fracturing treatment. The proppant particles can be mixed with fluid to form a proppant-fluid mixture. In some implementations, the proppant-fluid mixture is a multi-phase fluid that includes solid proppant particles suspended in a liquid medium (e.g., water or a water-based solution, oil or an oil-based solution, etc.). The fluid can include liquids, gels, gases, or a combination of these and other fluid phases. The solid proppant particles can include naturally-occurring particles such as sand grains, or man-made particles such as resin-coated sand or ceramics. Proppant can be selected to have one or more properties such as size, sphericity, density, specific gravity, or another property.

Hydraulic fracturing with proppant application can improve the conductivity of a hydrocarbon reservoir, and modeling the hydraulic fracturing treatment, including proppant transport, can help to efficiently design, analyze, or optimize the treatment. In some cases, a hydraulic fracturing model combines simulations of fracture propagation, rock deformation, fluid flow, proppant transport, and other phenomena. The fluid flow models used in these and other types of simulations can account for the complex physical environments and conditions.

Some fluid flow models use a finite difference approach for simulating the system. In a typical finite difference approach, the computational geometry domain can be discretely represented by sequence of connected points called "nodes" or "grid points" or "a mesh." The nodes can represent locations in one, two, or three dimensions. The nodes need not be uniformly distributed in the computational domain. In some instances, numerical schemes can be optimized or otherwise improved by distributing the nodes in the relevant domain. The nodes can represent discretized locations where simulation variables are calculated.

The simulation variables can be described by governing equations included in the fluid flow model. The governing equations of the fluid flow model can be approximated by discretizing the equations and computing quantities of interest at the nodes, for example, using finite difference operators or other techniques. The governing equations for fluid flow can include momentum conservation equations, mass conservation equations, energy balance equations, or other equations.

Figure 1:
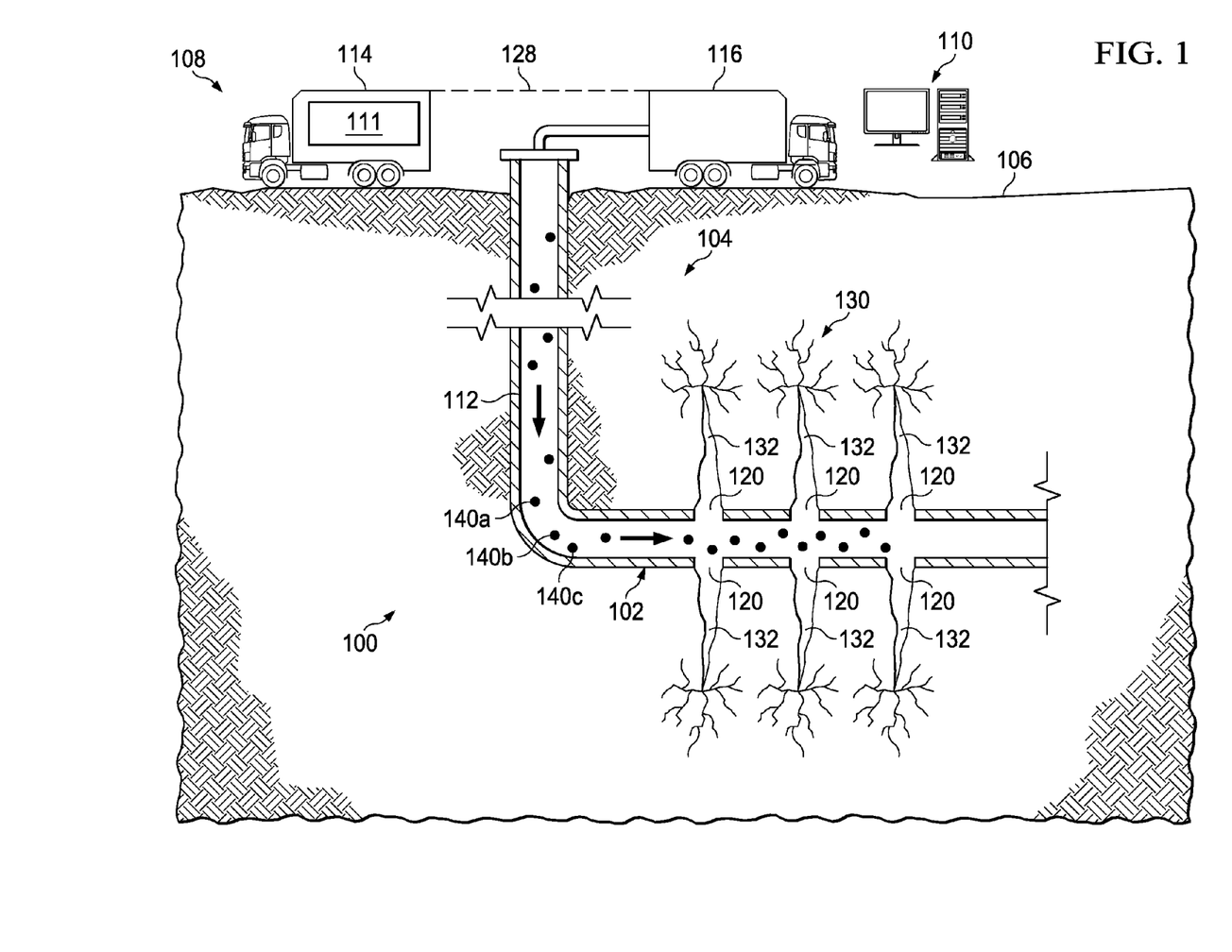
FIG. 1 is a schematic diagram of an example well system.

FIG. 1 is a diagram of an example well system 100 and a computing subsystem 110. The example well system 100 includes a wellbore 102 in a subterranean region 104 beneath the ground surface 106. The example wellbore 102 shown in FIG. 1 includes a horizontal wellbore. However, a well system may include any combination of horizontal, vertical, slant, curved, or other wellbore orientations. The well system 100 can include one or more additional treatment wells, observation wells, or other types of wells.

The computing subsystem 110 can include one or more computing devices or systems located at the wellbore 102 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system can be arranged as shown in FIG. 1 or in another configuration.

The example subterranean region 104 may include a reservoir that contains hydrocarbon resources, such as oil, natural gas, or others. For example, the subterranean region 104 may include all or part of a rock formation (e.g., shale, coal, sandstone, granite, or others) that contain natural gas. The subterranean region 104 may include naturally fractured rock or natural rock formations that are not fractured to any significant degree. The subterranean region 104 may include tight gas formations that include low permeability rock (e.g., shale, coal, or others).

The example well system 100 shown in FIG. 1 includes an injection system 108. The injection system 108 can be used to perform an injection treatment, whereby fluid is injected into the subterranean region 104 through the wellbore 102. In some instances, the fluid includes a proppant. The proppant can be particles, such as the example proppant particles 140a, 140b, 140c shown in FIG. 1. In some instances, the injection treatment fractures part of a rock formation or other materials in the subterranean region 104. In such examples, fracturing the rock may increase the surface area of the formation, which may increase the rate at which the formation conducts fluid resources to the wellbore 102. In some instances, the proppant particles 140a, 140b, 140c flow into the fractures to hold the fractures open, which may improve the effective permeability of the subterranean region 104.

The example injection system 108 can inject treatment fluid into the subterranean region 104 from the wellbore 102. For example, a fracture treatment can be applied at a single fluid injection location or at multiple fluid injection locations in a subterranean zone, and the fluid may be injected over a single time period or over multiple different time periods. In some instances, a fracture treatment can use multiple different fluid injection locations in a single wellbore, multiple fluid injection locations in multiple different wellbores, or any suitable combination. Moreover, the fracture treatment can inject fluid through any suitable type of wellbore, such as, for example, vertical wellbores, slant wellbores, horizontal wellbores, curved wellbores, or combinations of these and others.

The example injection system 108 includes instrument trucks 114, pump trucks 116, and an injection treatment control subsystem 111. The injection system 108 may apply injection treatments that include, for example, a multi-stage fracturing treatment, a single-stage fracture treatment, a mini-fracture test treatment, a follow-on fracture treatment, a re-fracture treatment, a final fracture treatment, other types of fracture treatments, or a combination of these. The injection system 108 may inject fluid into the formation above, at or below a fracture initiation pressure for the formation; above, at or below a fracture closure pressure for the formation; or at another fluid pressure.

The pump trucks 116 can include mobile vehicles, immobile installations, skids, hoses, tubes, fluid tanks, fluid reservoirs, pumps, valves, mixers, or other types of structures and equipment. The example pump trucks 116 shown in FIG. 1 can supply treatment fluid or other materials for the injection treatment. The example pump trucks 116 can communicate treatment fluids into the wellbore 102 at or near the level of the ground surface 106. The treatment fluids can be communicated through the wellbore 102 from the ground surface 106 level by a conduit installed in the wellbore 102. The conduit 112 may include casing cemented to the wall of the wellbore 102. In some implementations, all or a portion of the wellbore 102 may be left open, without casing. The conduit 112 may include a working string, coiled tubing, sectioned pipe, or other types of conduit.

The instrument trucks 114 can include mobile vehicles, immobile installations, or other structures. The example instrument trucks 114 shown in FIG. 1 include an injection treatment control subsystem 111 that controls or monitors the injection treatment applied by the injection system 108. The communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102 or other devices and equipment. In some implementations, communication links allow the instrument trucks 114 to communicate with the computing subsystem 110, which may run simulations and provide simulation data. The well system 100 can include multiple uncoupled communication links or a network of coupled communication links. The communication links can include wired or wireless communications systems, or combinations of them.

The injection system 108 may also include surface and down-hole sensors to measure pressure, rate, temperature or other parameters of treatment or production activities. For example, the injection system 108 may include pressure meters or other equipment that measure the pressure of fluids in the wellbore 102 at or near the ground surface 106 level or at other locations. The injection system 108 may include pump controls or other types of controls for starting, stopping, increasing, decreasing or otherwise controlling pumping as well as controls for selecting or otherwise controlling fluids pumped during the injection treatment. The injection treatment control subsystem 111 may communicate with such equipment to monitor and control the injection treatment.

The example injection treatment control subsystem 111 shown in FIG. 1 controls operation of the injection system 108. The injection treatment control subsystem 111 may include data processing equipment, communication equipment, or other systems that control injection treatments applied to the subterranean region 104 through the wellbore 102. The injection treatment control subsystem 111 may be communicably linked to the computing subsystem 110, which may calculate, select, or optimize fracture treatment parameters for initialization, propagation, or opening fractures in the subterranean region 104. The injection treatment control subsystem 111 may receive, generate or modify an injection treatment plan (e.g., a pumping schedule) that specifies properties of an injection treatment to be applied to the subterranean region 104.

In the example shown in FIG. 1, an injection treatment has fractured the subterranean region 104. FIG. 1 shows examples of dominant fractures 132 formed by fluid injection through perforations 120 along the wellbore 102. Generally, the fractures can include fractures of any type, number, length, shape, geometry or aperture. Fractures can extend in any direction or orientation, and they may be formed at multiple stages or intervals, at different times or simultaneously. The example dominant fractures 132 shown in FIG. 1 extend through natural fracture networks 130. Generally, fractures may extend through naturally fractured rock, regions of un-fractured rock, or both. The injected fracturing fluid can flow from the dominant fractures 132, into the rock matrix, into the natural fracture networks 130, or in other locations in the subterranean region 104. The injected fracturing fluid can, in some instances, dilate or propagate the natural fractures or other pre-existing fractures in the rock formation.

In some implementations, the computing subsystem 110 can simulate fluid flow in the well system 100. For example, the computing subsystem 110 can include flow models for simulating fluid flow in or between various locations of fluid flow in the well system, such as, for example, the wellbore 102, the perforations 120, the conduit 112 or components thereof, the dominant fractures 132, the natural fracture networks 130, the rock media in the subterranean region 104, or a combination of these and others. The flow models can model the flow of incompressible fluids (e.g., liquids), compressible fluids (e.g., gases), mixtures (e.g., a proppant-fluid mixture), or a combination multiple fluid phases. The flow models can model the flow of fluid in an intersection of flow paths. In some instances, the flow models can model flow in one, two, or three spatial dimensions. The flow models can include nonlinear systems of differential or partial differential equations. The computing subsystem 110 can generate nodes or a mesh for use in the flow models or simulations. The computing subsystem 110 can use the flow models to predict, describe, or otherwise analyze the dynamic behavior of fluid in the well system 100.

The computing subsystem 110 can perform simulations before, during, or after the injection treatment. In some implementations, the injection treatment control subsystem 111 controls the injection treatment based on simulations performed by the computing subsystem 110. For example, a pumping schedule or other aspects of a fracture treatment plan can be generated in advance based on simulations performed by the computing subsystem 110. As another example, the injection treatment control subsystem 111 can modify, update, or generate a fracture treatment plan based on simulations performed by the computing subsystem 110 in real time during the injection treatment.

In some cases, the simulations are based on data obtained from the well system 100. For example, pressure meters, flow monitors, microseismic equipment, tiltmeters, or other equipment can perform measurements before, during, or after an injection treatment; and the computing subsystem 110 can simulate fluid flow based on the measured data. In some cases, the injection treatment control subsystem 111 can select or modify (e.g., increase or decrease) fluid pressures, fluid densities, fluid compositions, and other control parameters based on data provided by the simulations. In some instances, data provided by the simulations can be displayed in real time during the injection treatment, for example, to an engineer or other operator of the well system 100.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

Figure 2:
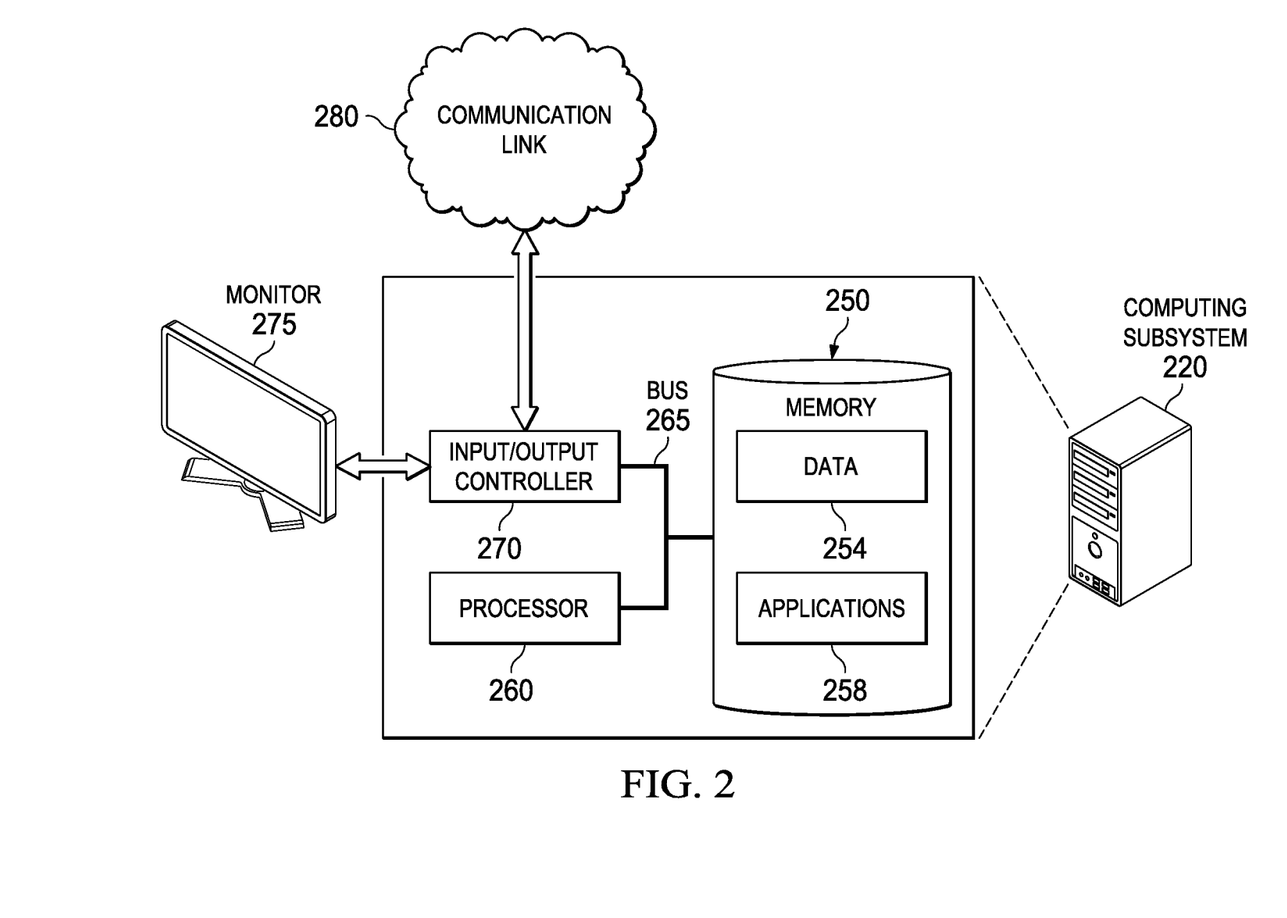
FIG. 2 is a schematic diagram of an example computing system.

FIG. 2 is a diagram of an example computing system 200. The example computing system 200 can operate as the example computing subsystem 110 shown in FIG. 1, or it may operate in another manner. For example, the computing system 200 can be located at or near one or more wells of a well system or at a remote location apart from a well system. All or part of the computing system 200 may operate independent of a well system or well system components. The example computing system 200 includes a memory 250, a processor 260, and input/output controllers 270 communicably coupled by a bus 265. The memory 250 can include, for example, a random access memory (RAM), a storage device (e.g., a writable read-only memory (ROM) or others), a hard disk, or another type of storage medium. The computing system 200 can be preprogrammed or it can be programmed (and reprogrammed) by loading a program from another source (e.g., from a CD-ROM, from another computer device through a data network, or in another manner). In some examples, the input/output controller 270 is coupled to input/output devices (e.g. a monitor 275, a mouse, a keyboard, or other input/output devices) and to a communication link 280. The input/output devices can receive or transmit data in analog or digital form over communication links such as a serial link, a wireless link (e.g. infrared, radio frequency, or others), a parallel link, or another type of link.

The communication link 280 can include any type of communication channel, connector, data communication network, or other link. For example, the communication link 280 can include a wireless or a wired network, a Local Area Network (LAN), a Wide Area Network (WAN), a private network, a public network (such as the Internet), a WiFi network, a network that includes a satellite link, or another type of data communication network.

The memory 250 can store instructions (e.g., computer code) associated with an operating system, computer applications, and other resources. The memory 250 can also store application data and data objects that can be interpreted by one or more applications or virtual machines running on the computing system 200. As shown in FIG. 2, the example memory 250 includes data 254 and applications 258. The data 254 can include treatment data, geological data, fracture data, fluid data, or any other appropriate data. The applications 258 can include flow models, fracture treatment simulation software, reservoir simulation software, or other types of applications. In some implementations, a memory of a computing device includes additional or different data, application, models, or other information.

In some instances, the data 254 include treatment data relating to fracture treatment plans. For example the treatment data can indicate a pumping schedule, parameters of a previous injection treatment, parameters of a future injection treatment, or parameters of a proposed injection treatment. Such parameters may include information on flow rates, flow volumes, slurry concentrations, fluid compositions, injection locations, injection times, or other parameters.

In some instances, the data 254 include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, or other attributes of one or more rock formations in the subterranean zone. The geological data can include information collected from well logs, rock samples, outcroppings, microseismic imaging, or other data sources.

In some instances, the data 254 include fracture data relating to fractures in the subterranean region. The fracture data may identify the locations, sizes, shapes, and other properties of fractures in a model of a subterranean zone. The fracture data can include information on natural fractures, hydraulically-induced fractures, or any other type of discontinuity in the subterranean region. The fracture data can include fracture planes calculated from microseismic data or other information. For each fracture plane, the fracture data can include information (e.g., strike angle, dip angle, etc.) identifying an orientation of the fracture, information identifying a shape (e.g., curvature, aperture, etc.) of the fracture, information identifying boundaries of the fracture, or any other suitable information.

In some instances, the data 254 include fluid data relating to well system fluids. The fluid data may identify types of fluids, fluid properties, thermodynamic conditions, and other information related to well system fluids. The fluid data can include flow models for compressible or incompressible fluid flow. For example, the fluid data can include systems of governing equations (e.g., Navier-Stokes equation, continuity equation, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, proppants, hydraulic fluids that operate well system tools, or other fluids that may or may not be related to a well system.

The applications 258 can include software applications, scripts, programs, functions, executables, or other modules that are interpreted or executed by the processor 260. For example, the applications 258 can include a fluid flow simulation module, a hydraulic fracture simulation module, a reservoir simulation module, or another other type of simulator. The applications 258 may include machine-readable instructions for performing one or more of the operations related to FIGS. 3-6. For example, the applications 258 can include modules or algorithms for modeling fluid flow in a wellbore. The applications 258 may include machine-readable instructions for generating a user interface or a plot, for example, illustrating fluid flow or fluid properties. The applications 258 can receive input data, such as treatment data, geological data, fracture data, fluid data, or other types of input data, from the memory 250, from another local source, or from one or more remote sources (e.g., via the communication link 280). The applications 258 can generate output data and store the output data in the memory 250, in another local medium, or in one or more remote devices (e.g., by sending the output data via the communication link 280).

The processor 260 can execute instructions, for example, to generate output data based on data inputs. For example, the processor 260 can run the applications 258 by executing or interpreting the software, scripts, programs, functions, executables, or other modules contained in the applications 258. The processor 260 may perform one or more of the operations related to FIGS. 3-6. The input data received by the processor 260 or the output data generated by the processor 260 can include any of the treatment data, the geological data, the fracture data, or any other data.

Figure 3:
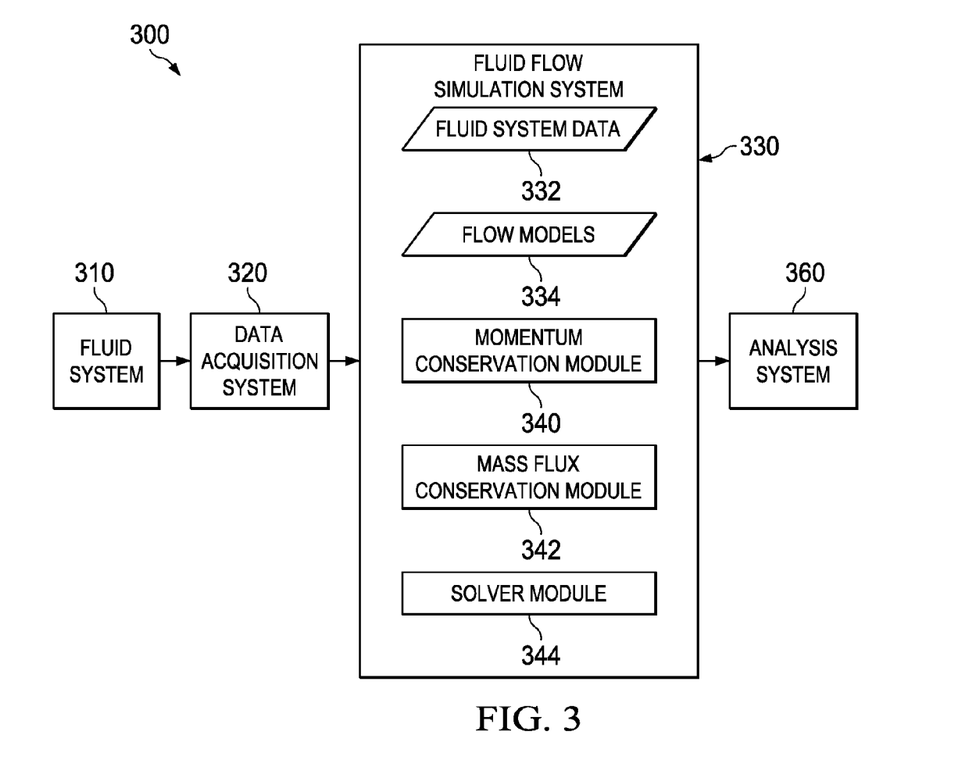
FIG. 3 is a diagram of an example system architecture.

FIG. 3 is a diagram of an example system architecture 300. The example system architecture 300 can be used to model physical phenomena related to a well system environment. For example, the architecture 300 can be used to model fluid flow in an injection treatment of the subterranean region 104 shown in FIG. 1. In some instances, the fluid modeled includes a proppant component. In some instances, the architecture 300 is used to model fluid flow and other aspects of an injection treatment or other activities in a well system. In some cases, the architecture 300 is used to model fluid flow within or between one or more wellbores, wellbore conduits, wellbore tools, wellbore perforations, reservoir rock media, reservoir fractures (e.g., fractures in a complex fracture network, in a dominant bi-wing fracture extending from a wellbore, in a natural fracture network, in hydraulically-induced fractures, etc.), or combinations of these and other types of flow paths in a well system environment.

The example architecture 300 shown in FIG. 3 includes a fluid system 310, a data acquisition system 320, a fluid flow simulation system 330, and an analysis system 360. The architecture 300 can include additional or different components or subsystems, and the example components shown in FIG. 3 can be combined, integrated, divided, or configured in another manner. For example, the fluid flow simulation system 330 and the analysis system 360 can be subcomponents of an integrated computing system (e.g., the computing system 200 shown in FIG. 2) or multiple computing systems; or the data acquisition system 320 can be integrated with the fluid system 310. As another example, the fluid flow simulation system 330 or the analysis system 360, or both, can be implemented in a computing system that operates independent of the fluid system 310 or the data acquisition system 320.

The example fluid system 310 can include any physical system where fluid flow or other fluid phenomena occur. The fluid system 310 can represent a well system environment (e.g., the well system 100 shown in FIG. 1) or a subset of well system components or subsystems (e.g., the injection system 108 shown in FIG. 1). The fluid system 310 can include the physical reservoir rock in a subterranean reservoir (e.g., the subterranean region 104 shown in FIG. 1), fractures or a fracture network in the reservoir rock, one or more downhole systems installed in a wellbore, or a combination of them.

The data acquisition system 320 can include systems or hardware that obtain data from the fluid system 310. For example, the data acquisition system 320 can include flow sensors, pressure sensors, temperature sensors, and other types of measurement devices. The data acquisition system 320 can include communication and data storage systems that store, transfer, manipulate, or otherwise manage the information obtained from the fluid system 310.

The fluid flow simulation system 330 can include one or more computer systems or computer-implemented programs that simulate fluid flow. The fluid flow simulation system 330 can receive information related to the fluid system 310 and simulate fluid flow and other fluid phenomena that occur in the fluid system 310. For example, the fluid flow simulation system 330 can calculate flow velocities, pressures, or other aspects of fluid flow based on data from the data acquisition system 320 or another source.

The example fluid flow simulation system 330 includes fluid system data 332, flow models 334, a momentum conservation module 340, a mass flux conservation module 342, and a solver module 344. The fluid flow simulation system can include additional or different features, and the features of a fluid flow simulation system 330 can be configured to operate in another manner. The modules of the fluid flow simulation system 330 can include hardware modules, software modules, or other types of modules. In some cases, the modules can be integrated with each other or with other system components. In some example implementations, the fluid flow simulation system 330 can be implemented as software running on a computing system, and the modules of the fluid flow simulation system 330 can be implemented as software functions or routines that are executed by the computing system.

The fluid system data 332 can include any information related to the fluid system 310 or another fluid system. For example, the fluid system data 332 can indicate physical properties (e.g., geometry, cross-sectional areas, surface properties, etc.) of one or more flow paths in the fluid system 310, material properties (e.g., density, viscosity, Reynolds number, etc.) of one or more fluids in the fluid system 310, thermodynamic data (e.g., fluid pressures, fluid temperatures, fluid flow rates, etc.) measured at one or more locations in the fluid system 310, and other types of information. The fluid system data 332 can include information received from the data acquisition system 320 and other sources.

The flow models 334 can include any information or modules that can be used to simulate fluid flow. The flow models 334 can include governing equations, spatial and temporal discretization data, or other information. The flow models 334 can include a proppant transport flow model to simulate proppant flow. In some examples, the flow models 334 include governing flow equations, such as, for example, the Navier-Stokes equation or related approximations of the Navier-Stokes equation, diffusion-convection equations, continuity equations, or other types of flow equations. As an example, the flow models 334 may include any equations below, or the flow models 334 may include additional or different governing flow equations.

The flow models 334 can include spatial discretization data, such as, for example, discrete nodes that represent locations of fluid flow along flow paths in the fluid system 310. Generally, the flow models 334 can represent any number of intersecting flow path branches, including any type of flow path intersection. In some cases, the flow path branches represent a fracture network in a subterranean region, and connectivity between the flow path branches can correspond to the fracture connectivity in the fracture network. In some cases, the flow paths represent flow conduits in a wellbore, perforations in a wellbore casing, hydraulic fractures extending from a wellbore, natural fractures connected to hydraulic fractures or a wellbore, or other types of interconnected flow paths in a well system environment.

The spatial discretization of the flow paths can be implemented by any suitable algorithm. For example, the system can be discretized according to a finite difference model, a finite volume model, finite element model, or another technique. The system can be discretized in a manner that permits spatial derivatives or partial spatial derivatives to be solved in the discretized spatial domain using numerical methods. The system can be discretized in a manner that also permits time derivatives or partial time derivatives to be solved in the discretized temporal domain using numerical methods.

As shown in FIG. 3, the fluid flow simulation system 330 can also include a momentum conservation module 340. The momentum conservation module 340 can include any information or modules that can be used to model momentum conservation in a fluid flow model. For example, the momentum conservation module 340 can balance axial momentum in an axial flow direction against dynamic changes in a transverse momentum. In some instances, the momentum conservation module 340 models proppant momentum, fluid momentum, or the momentum of a proppant-fluid mixture.

As shown in FIG. 3, the fluid flow simulation system 330 can also include a mass flux conservation module 342. The mass flux conservation module 342 can include any information or modules that can be used to model mass flux conservation in a fluid flow model. In some cases, the mass flux conservation module 342 accounts for a bed height and settling velocity of the proppant in the proppant-fluid mixture.

The solver 344 can include any information or modules that can be used to solve a system of equations. For example, the solver 344 can be a direct solver or another type of solver. In some implementations, the solver 344 receives inputs from the other components of the fluid flow simulation system 330. For example, the inputs can include the discretized governing flow equations, information from momentum conservation module 340 or mass flux conservation module 342, the fluid system data 332, or any other information. The inputs can also include data generated or reported from a separate simulation or model. The solver 344 can generate a numerical solution for a variable of interest based on the inputs. The solution can be generated for some or all of the grid points in a discretized spatial domain. For example, the solver 344 may calculate values of fluid velocity, fluid pressure, or another variable over a spatial domain; the values can be calculated for an individual time step or multiple time steps.

The analysis system 360 can include any systems, components, or modules that analyze, process, use, or access the simulation data generated by the fluid flow simulation system 330. For example, the analysis system 360 can be a real time analysis system that displays or otherwise presents fluid data (e.g., to a field engineer, etc.) during an injection treatment. In some cases, the analysis system 360 includes other simulators or a simulation manager that use the fluid simulation data to simulate other aspects of a well system. For example, the analysis system 360 can be a fracture simulation suite that simulates fracture propagation based on the simulated fluid flow data generated by the fluid flow simulation system 330. As another example, the analysis system 360 can be a reservoir simulation suite that simulates fluid migration in a reservoir based on the simulated fluid flow data generated by the fluid flow simulation system 330.

Figure 4:
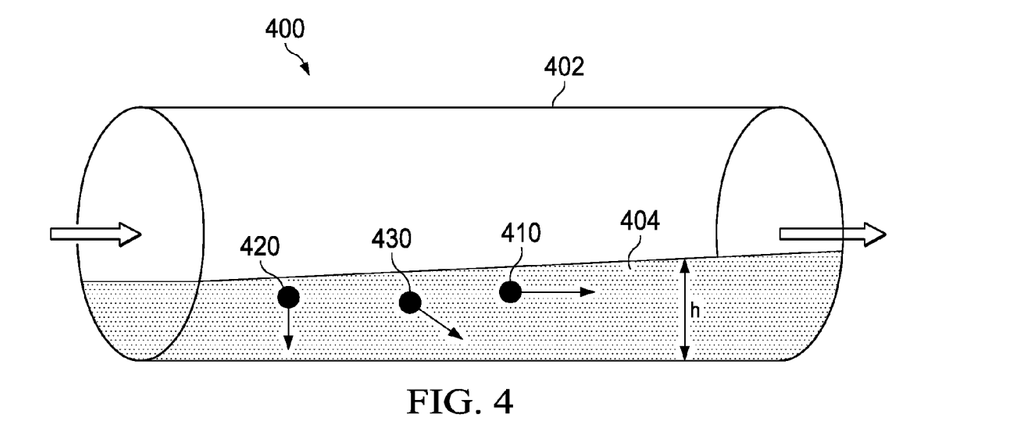
FIG. 4 is a diagram of an example fluid channel with settled proppant.

FIG. 4 is diagram of an example wellbore environment 400. The wellbore environment 400 includes an example wellbore 402. The wellbore 402 can be substantially similar to the wellbore 102 shown in FIG. 1. The wellbore 402 can contain fluid such as a fracturing fluid, a proppant-fluid mixture, or other fluid. The example wellbore 402 can transport proppant, shown in FIG. 4 by example proppant particles 410, 420, and 430. The wellbore 402 shown in FIG. 4 is an example of a flow path for a proppant-fluid mixture in a well system environment; other flow paths for proppant-fluid mixtures in a well system environment may have the same, similar, or different features.

Proppant particles flowing in a flow path can have an axial momentum with a velocity in the direction of axial flow, as shown by particle 410. The axial flow direction is the primary flow direction of the proppant-fluid mixture. For example, the axial flow direction can be defined by the long dimension of the flow path. In some cases, the fluid can develops eddy currents that include transverse flow components, or the individual proppant particles can move in a transverse direction, while the bulk proppant-fluid mixture moves primarily in the axial direction. In a one-dimensional flow model, the spatial dimension of the model can be defined as the axial flow direction. Proppant particles can also have a transverse momentum component, corresponding to a velocity that is perpendicular to the axial flow, as shown by particle 420. Proppant particles can generally have a momentum that is a combination of axial and transverse components, as shown by particle 430. Transverse momentum can be imparted on a particle, for example, by gravity, pressure variations, temperature variations, flow path geometry, or a combination of these and other aspects of the flow environment. Many particles can settle at the bottom of a flow path, forming a layer of particles, such as settled proppant layer 404 shown in FIG. 4.

A layer of settled proppant can reduce the volume of the flow path through which a fluid can freely flow. Thus, a wellbore with a layer of settled proppant can have an effective cross-section $A_0$ for free flow that is less than the total cross-section of the wellbore. The effective cross-section of the wellbore need not be constant along the length of the wellbore. Thus, the effective cross-section $A_0$ of the wellbore can depend on the bed height h of the settled proppant layer, which can vary along the length of the wellbore. The bed height h of the wellbore can also change dynamically over time.

The dynamic changes of effective cross-section area $A_0$ can be obtained, for example, using a mass flux conservation model that accounts for the bed height h and a settling velocity $v_{settling}$ of the proppant in the proppant-fluid mixture. For example, the mass flux conservation model can include an expression for the mass flux balance of the proppant in the proppant-fluid mixture:

$$\rho_p \phi_{critical} \frac{\partial h}{\partial t} = \rho_p \phi_p v_{settling} + \rho_p \phi_p v_*. \qquad (1)$$

The bed height h can be calculated by integrating equation (1) in time. In equation (1), $\rho_p$ represents the proppant density, $v_{settling}$ represents the proppant settling velocity (i.e., the transverse velocity in the direction of the settled proppant layer), $\phi_p$ represents the proppant concentration, $v_*$ represents the frictional shear velocity for re-suspension, and $\phi_{critical}$ represents the critical proppant volume fraction (e.g., 0.52). The frictional shear velocity $v_*$ is a parameter that characterizes the shear stress on the flowing proppant at the interface between the flowing proppant and the settled proppant layer. The critical proppant volume fraction $\phi_{critical}$ is the value of proppant volume fraction characterizing the transition between "fluid-like" bulk proppant behavior and "solid-like" bulk proppant behavior. The proppant bed height h associated with settling is integrated to the system to compute the effective cross-sectional area $A_0$ for the fluid flow.

The change in effective cross-section area $A_0$ captured in equation (1) can be incorporated into the proppant transport flow model. For example, the proppant mass balance for proppant in the proppant-fluid mixture can be computed based on shell balances from the following equation (2):

$$\frac{d(A_0 \rho_p \phi_p)}{dt} + \frac{d(A_0 \rho_p \phi_p v_p)}{dx} = \rho_p \phi_{critical} \frac{dA}{dt}. \qquad (2)$$

In equation (2), $v_p$ represents the axial proppant velocity. The first term on the right-hand-side in the proppant mass balance equation (2) represents mass loss due to settling where A represents the area occupied by the settled proppant.

Bed height h can be an implicit function of axial distance because of its dependence on the volume fraction. In some example proppant transport flow models, the variation of height with axial distance is not incorporated because of an assumption that the settled proppant is stationary and it is an immobile layer.

As particles of proppant settle into the bed or become re-suspended into the proppant-fluid mixture, the momentum of the proppant and the momentum of the proppant-fluid mixture can change dynamically over time. The momentum changes can be modeled by an example proppant momentum conservation model based on momentum balance equations. The momentum balance for the proppant can be based on shell balances leading to the following equation:

$$\frac{\partial(A_0 \rho_p \phi_p v_p)}{\partial t} + \frac{\partial(A_0 \rho_p \phi_p v_p^2)}{\partial \eta} + \frac{\partial(A_0 P_p \phi_p)}{\partial \eta} - A_0 \rho_p \phi_p g \cos\theta = \qquad (3)$$
$$-\rho_p \phi_{critical} \frac{dA}{dt} v_p - \beta(v_f - v_p).$$

Similarly, the momentum balance for the proppant-fluid mixture can be $$\frac{\partial(A_0 \rho_m \phi_m v_{pm})}{\partial t} + \frac{\partial(A_0 \rho_m \phi_m v_m^2)}{\partial \eta} + \frac{\partial(A_0 P_m \phi_m)}{\partial \eta} + \qquad (4)$$
$$A_0 \frac{dp}{dL}\bigg|_{friction} - A_0 \rho_m \phi_m g \cos\theta = -\beta(v_f - v_p).$$

In equations (3) and (4), the subscripts p, m, and f refer to proppant, proppant-fluid mixture, and fluid respectively. The momentum change due to the pull of gravity is represented by the g cos θ term, where θ is the angle of the acceleration due to gravity with respect to the axial flow direction. In equations (3) and (4), η represents the spatial coordinate and β represents the interphase interaction coefficient. $P_p$ and $P_m$ represent the proppant pressure and proppant-fluid mixture pressure, respectively, and are the sum of kinematic pressures and fluid pressures.

Through equation (3), the example proppant momentum conservation model varies the axial proppant momentum in the axial flow direction to account for proppant settling in another direction, and the model balances the axial proppant momentum against dynamic changes in the transverse proppant momentum. For example, the first term on the right-hand-side in the proppant momentum balance equation (3) represents momentum loss due to settling where A represents the area occupied by the settled proppant. As the fluid and proppant interact during suspension and re-suspension of the proppant, momentum can be transferred from the settled proppant to the fluid and vice versa. The interphase interaction term $\beta(v_f-v_p)$ in equations (3) and (4) represents this interphase momentum transfer between the fluid and the settled proppant during suspension and re-suspension. The interphase interaction coefficient β can be a constant value, a variable that is computed by a model, or another type of value. In some instances, the interphase interaction coefficient β can be computed using a conventional equation for an interphase interaction coefficient. Via the interphase interaction term, the example proppant momentum conservation model varies the axial proppant momentum to account for interphase momentum transfer between the proppant and the fluid. As the fluid and proppant interacts, heat can be transferred from the fluid to the proppant or vice-versa, and the temperatures of fluid and proppant can change over time. The momentum conservation model can also account for the temperature evolution of the proppant-fluid mixture by varying the axial proppant momentum.

The proppant transport flow model can also include equations for the mass balance of the proppant-fluid mixture. For example, the mass balance for the proppant-fluid mixture can be given by:

$$\frac{d(A_0 \rho_m \phi_m)}{dt} + \frac{d(A_0 \rho_m \phi_m v_m)}{dx} = 0. \qquad (5)$$

The energy transfer between the fluid and the formation occurs through the annulus, casing, and cement and can be modeled using an energy balance equation. Thermal properties used in the energy model can be calculated as proppant-fluid mixture quantities. For example, the energy balance of the proppant-fluid mixture can be given by:

$$\frac{\partial E}{\partial t} = -\frac{\partial}{\partial \eta}\left(\left(E + P_m - \frac{4\mu_m}{3}\frac{\partial v_m}{\partial \eta}\right)v_m\right) + q + \rho_m v_m g \sin\theta + S. \quad (6)$$

In equation (6), the energy of the proppant-fluid mixture E is given by:

$$E = \frac{1}{2}\rho_m v_m^2 + U. \quad (7)$$

In equation (7), U represents the internal energy of the proppant-fluid mixture. In equation (6), the heat from the formation surrounding the wellbore is represented as a heat source S. Heat transfer between the proppant-fluid mixture and the formation is represented by q, given by:

$$q = U_{to}(T - T_e). \quad (8)$$

In equation (8), T is the temperature of the proppant-fluid mixture, and $T_e$ is the temperature of the formation surrounding the wellbore. The heat transfer term of equation (8) also includes overall heat transfer coefficient $U_{to}$.

In some examples, a one-dimensional proppant transport flow model is a multiphase flow model that incorporates gravitational proppant settling and proppant re-suspension. The model can predict the bed height of the proppant and its effect on the fluid flow and predict the temperature evolution of the proppant-fluid mixture. The example one-dimensional proppant transport flow model can produce accurate and stable predictions of these proppant and fluid properties. The model can include mass and momentum losses associated with settling as source terms in the one-dimensional model solving for momentum and mass conservation equations for each phase, and thus eliminate or reduce the need to solve for multi-dimensional models. Thus, a one-dimensional model can reduce computation time over multi-dimensional models.

Figure 5:
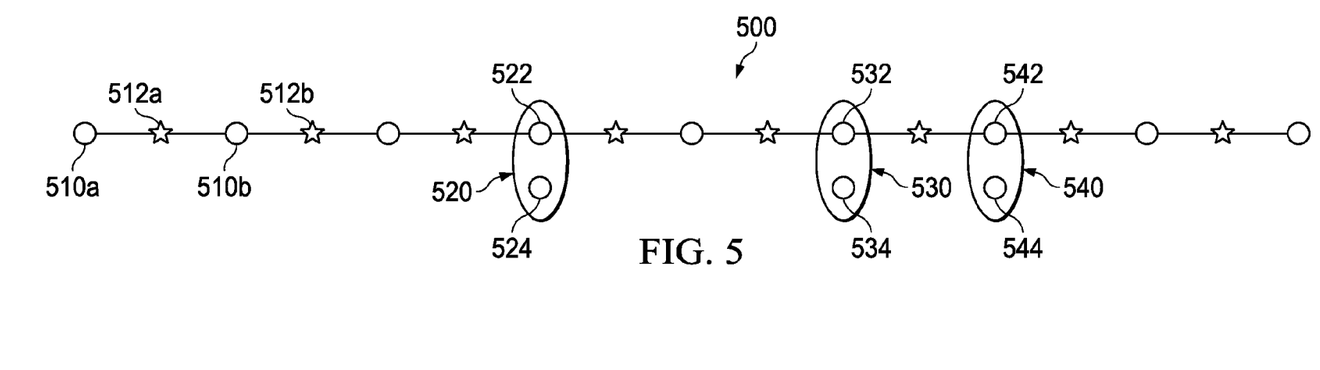
FIG. 5 is a diagram showing an example flow path with nodes.

FIG. 5 is a diagram showing aspects of an example proppant transport flow model 500. The example proppant transport flow model 500 is based on a nodal discretization of a fluid flow model of a wellbore in a subterranean environment. The proppant transport flow model 500 can model proppant-fluid mixture flow in a wellbore with perforations, such as, for example, in the example well system shown in FIG. 1. The example fluid flow model 500 includes multiple nodes such as nodes 510a, 510b, 522, 524, 532, 534, 542, and 544. The example fluid flow model 500 also includes staggered points such as staggered points 512a, 512b.

Discontinuities at perforations can be represented by groups of nodes. For example, perforation 520 is represented by a group of nodes 522 and 524, perforation 530 by a group of nodes 532 and 534, and perforation 540 by a group of nodes 542 and 544. A flow path in a one-dimensional flow model can include any number of nodes, groups of nodes, staggered points, or perforations. In some cases, nodes and staggered points represent locations where fluid flow values (e.g. pressure, flow velocity, momentum) are calculated in simulations of the proppant transport fluid flow model 500. The variables are collocated at the nodes (e.g. nodes 510a, 510b). Continuity, momentum and energy equations are solved at the staggered points (e.g. points 512a, 512b). The nodes, staggered points, or perforations can be distributed uniformly or non-uniformly. A staggered grid approach can be used as shown in FIG. 5 that can avoid collocated pressure-velocity coupling in the model that can cause computational instabilities.

In some example one-dimensional models, fluid flow to the formation at perforations can create discontinuities in calculated variables. For example, the one-dimensional model described herein can capture the behavior of velocity discontinuities at perforations. The discontinuities can be modeled in the one-dimensional model by using two nodes collocated at each perforation, one node representing an upstream node and the other node representing a downstream node. For example, one node at a perforation can represent a portion of a fluid's velocity, and the other node can represent the remaining velocity. For another example, at perforation 520, the volume fraction and temperature at the downstream node is set equal to the volume fraction and temperature at the upstream node since the volume fraction and temperature are continuous at the perforations even when the velocity may have a discontinuity. The proppant mass and energy flux at each upstream node can be functions of the upstream node variables. The fluxes are not limited to upstream variables, and average fluxes can be computed. At each perforation, the continuity equation at each staggered point is solved at the downstream node.

The model can apply boundary conditions at inlets, outlet, or perforations. For example, the inlet velocity can replace the continuity equation at the inlet (e.g. node 510a) and the pressure at the perforation can replace the momentum equation at the perforation locations (e.g. perforations 520, 530, 540). The boundary conditions for volume fraction and temperature can be computed at other perforations. In some instances, the volume fraction and temperature boundary conditions are not computed at the last perforation (i.e., the most downstream perforation). For example, in FIG. 5, the last perforation is perforation 540. At the last perforation, in some cases, the volume fraction and temperature flux at the upstream node are calculated as a function of the upstream node variables. All the remaining fluid from the second-to-last perforation (e.g., perforation 530) can leave from the upstream node at the last perforation (e.g., perforation 540) to the formation. Thus, in some cases, no fluid enters the downstream node of the last perforation. The example model can consider the boundary condition that no fluid exists at the downstream node of the last perforation, and thus at the downstream node of the last perforation the volume fraction can be set to zero and the temperature can be set to the initial or ambient temperature. This example model approach can handle both positive and negative flows in the wellbore.

Figure 6:
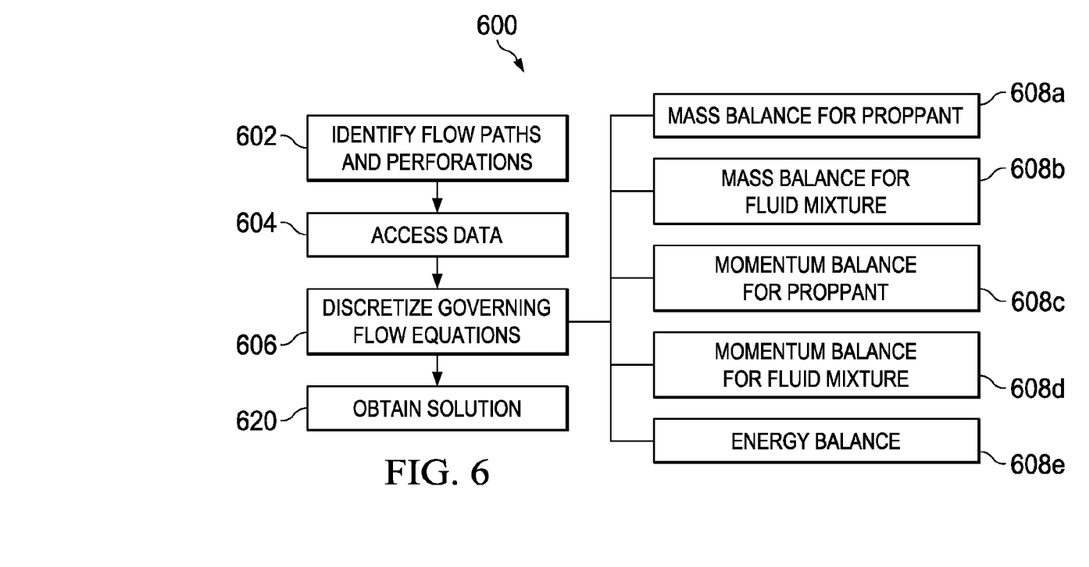
FIG. 6 is a flow chart showing a one-dimensional model for proppant transport.

FIG. 6 is a flow chart showing an example process 600 for simulating fluid and proppant flow in a wellbore. All or part of the example process 600 may be computer-implemented, for example, using the features and attributes of the example computing system 200 shown in FIG. 2 or other computing systems. The process 600, individual operations of the process 600, or groups of operations may be iterated or performed in parallel, in series, or in another manner. In some cases, the process 600 may include the same, additional, fewer, or different operations performed in the same or a different order.

The example process 600 can be used to simulate the flow of various fluids and fluid mixtures. In some cases, the process 600 is used to simulate one or more well system fluids, proppants, or fluid mixtures. Here, the term "well system fluid" is used broadly to encompass a wide variety of fluids that may be found in or near, or may be used in connection with, a well system. Well system fluids can include one or more native fluids that reside in a subterranean region (e.g., brine, oil, natural gas, etc.), one or more fluids that have been or will be injected into a subterranean region (e.g., fracturing fluids, treatment fluids, proppant-fluid mixtures, etc.), one or more fluids that have been or will be communicated within a wellbore or within one or more tools installed in the well bore (e.g., drilling fluids, hydraulic fluids, etc.), and other types of fluids. The example process 600 can also simulate multiple types of fluid flowing within the same system.

The example process 600 can simulate fluid flow based on a one-dimensional proppant transport flow model. The proppant transport flow model can include nodes or points of a discretized one-dimensional flow path. For example, the process 600 can use the example flow model 500 shown in FIG. 5, or another type of flow model. The one-dimensional proppant transport flow model can also include a proppant momentum conservation model, a mass flux conservation model, or a combination of these and other types of conservation models. The proppant transport flow model can also include governing equations and associated variables for each of the nodes. For example, the flow model can include the variables shown in FIG. 5, and the proppant transport flow model can include one or more of the example equations (1), (2), (3), (4) and (5) shown above. The flow model can include other types of variables or equations.

At 602, flow paths and perforations are identified. In some cases, the flow paths are identified as flow paths in a wellbore, and perforations along the flow paths are identified. Identifying the flow paths can include generating a discretized representation of the flow paths. The discretized representation can consist of one or more flow paths, grid points, nodes, staggered points, or groups of nodes, such as those shown in FIG. 5. In some cases, perforations are identified by individual groups of nodes comprising an upstream node and a downstream node. The example model can require fewer grid points compared to some conventional approaches. In some implementations, a flow path that does not include perforations can be modeled. The flow path can include multiple intersecting branches, multiple fluid domains, or a combination of these and other features.

At 604, model data are accessed. The model data can be based on the discretization of governing flow equations. The model data can include equations, mathematical expressions, data structures, or other types of information. The model data can include physical data or estimated data, such as values of variables associated with the model or equations, expressions, or information therein. For example, the model data can include values or estimates of velocity, momentum, mass, area, etc.

At 606, the governing equations are discretized. The governing flow equations can be provided by the proppant transport flow model or another source. The governing flow equations can include, for example, Navier-Stokes equations, Darcy flow equations, convection or diffusion equations, continuity equations, and others. The governing equations can be discretized according to a finite difference technique or another discretization method. The governing equations can include mass balance equations for the proppant (608a) or proppant-fluid mixture (608b). For example, the governing equations can include mass flux conservation model equations (1) and (2) for proppant mass balance or equation (5) for proppant-fluid mixture mass balance. The governing equations can include momentum conservation model equations for the proppant (608c) or proppant-fluid mixture (608d). For example, the governing equations can include equations (3) for proppant mass balance or equation (4) for proppant-fluid mixture mass balance. One or more of equations (1), (2), (3), (4), (5) or other equations for mass and momentum balance can be included in the governing equations. Temperature effects can be taken into consideration by including the full energy balance equation (608e).

At 620, a solution is obtained. The solution can be obtained based on a set of discretized governing flow equations, such as those associated with 606. In some implementations, the discretized governing flow equations are solved numerically. For example, an iterative method such as Newton's method can be used to solve the equations and obtain the solution. In some instances, an implicit time solution can be calculated. The solution can indicate one or more flow velocities, pressures, or values for other variables at each discretized location on the flow paths. The application of the finite difference method with a staggered grid approach can be used to solve for fluid transport, proppant transport and temperature computations in a wellbore with perforations.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

The invention claimed is:

1. A proppant transport flow modeling method comprising:
generating a one-dimensional proppant transport flow model representing flow of a proppant-fluid mixture in a subterranean region, the one-dimensional proppant transport flow model comprising a proppant momentum conservation model that balances axial proppant momentum in an axial flow direction of the proppant-fluid mixture against dynamic changes in transverse proppant momentum, the proppant momentum conservation model including a variable representing changes of a momentum of a proppant when the proppant settles into a bed of settled proppant and when the proppant becomes re-suspended from the bed of settled proppant into the proppant-fluid mixture;
simulating, by operation of a data processing apparatus, proppant transport in a well system fluid in a well system based on the one-dimensional proppant transport flow model including the proppant momentum conservation model; and
controlling an injection treatment in the well system by controlling a fluid parameter or a fracture treatment plan based on the simulating the one-dimensional proppant transport flow model.

2. The method of claim 1, wherein the proppant momentum conservation model varies the axial proppant momentum to account for interphase momentum transfer between a proppant and a fluid of the proppant-fluid mixture during suspension and re-suspension of the proppant.

3. The method of claim 1, wherein the proppant momentum conservation model varies the axial proppant momentum in the axial flow direction to account for proppant settling in another direction different from the axial flow direction.

4. The method of claim 1, wherein the momentum conservation model varies the axial proppant momentum to account for temperature evolution of the proppant-fluid mixture.

5. The method of claim 1, wherein the one-dimensional proppant transport flow model comprises a mass flux conservation model that accounts for a bed height and settling velocity of the proppant in the proppant-fluid mixture.

6. The method of claim 1, wherein the one-dimensional proppant transport flow model represents flow of the proppant-fluid mixture in at least one of a wellbore or a fracture in a subterranean rock formation.

7. The method of claim 1, wherein the one-dimensional proppant transport flow model includes a finite difference model and a plurality of discretized governing flow equations, and operating the one-dimensional proppant transport flow model comprises solving the discretized governing flow equations.

8. A non-transitory computer-readable medium storing instructions that, when executed by a data processing apparatus, perform operations comprising:
generating a one-dimensional proppant transport flow model representing flow of a proppant-fluid mixture in a subterranean region, the one-dimensional proppant transport flow model comprising a proppant momentum conservation model that balances axial proppant momentum in an axial flow direction of the proppant-fluid mixture against dynamic changes in transverse proppant momentum, the proppant momentum conservation model including a variable representing changes of a momentum of a proppant when the proppant settles into a bed of settled proppant and when the proppant becomes re-suspended from the bed of settled proppant into the proppant-fluid mixture;

simulating, by operation of a data processing apparatus, proppant transport in a well system fluid in a well system based on the one-dimensional proppant transport flow model including the proppant momentum conservation model; and controlling an injection treatment in the well system by controlling a fluid parameter or a fracture treatment plan based on the simulating the one-dimensional proppant transport flow model.

9. The computer-readable medium of claim 8, wherein the proppant momentum conservation model balances the axial proppant momentum and the transverse proppant momentum based on the equation:

$$\frac{\partial(A_0\rho_p\phi_p v_p)}{\partial t} + \frac{\partial(A_0\rho_p\phi_p v_p^2)}{\partial \eta} + \frac{\partial(A_0 P_p\phi_p)}{\partial \eta} - A_0\rho_p\phi_p g\cos\theta = -\rho_p\phi_{critical}\frac{dA}{dt}v_p - \beta(v_f - v_p),$$

where $A_0$ represents an effective cross-section for free flow in the subterranean region, $\rho_p$ represents proppant density as the mass of proppant per volume of proppant, $\phi_p$ represents the concentration of proppant mass in a volume of proppant-fluid mixture, $v_p$ represents the proppant's axial velocity, $v_f$ represents the fluid's axial velocity, $\phi_{critical}$ represents the proppant's critical volume fraction, A represents the area occupied by settled proppant, $\beta$ represents a coefficient for interphase interaction, $P_p$ represents the proppant's pressure, g represents acceleration due to gravity, $\theta$ is an angle of the acceleration due to gravity with respect to the axial flow direction, and t and $\eta$ represent time and spatial coordinates, respectively.

10. The computer-readable medium of claim 8, wherein the one-dimensional proppant transport flow model comprises a mass flux conservation model that accounts for a settled proppant bed height and a settling velocity of the proppant in the proppant-fluid mixture based on the equation:

$$\rho_p\phi_{critical}\frac{\partial h}{\partial t} = \rho_p\phi_p v_{settling} + \rho_p\phi_p v_*,$$

where h represents the settled proppant bed height, $\rho_p$ represents proppant density as the mass of proppant per volume of proppant, $\phi_p$ represents the concentration of proppant mass in a volume of proppant-fluid mixture, $\phi_{critical}$ represents the proppant's critical volume fraction, $v_{settling}$ represents the proppant setting velocity, t represents time, and $v_*$, represents the proppant's frictional shear velocity for re-suspension.

11. The computer-readable medium of claim 8, wherein the proppant momentum conservation model varies the axial proppant momentum to account for interphase momentum transfer between a proppant and a fluid of the proppant-fluid mixture during suspension and re-suspension of the proppant.

12. The computer-readable medium of claim 8, wherein the proppant momentum conservation model varies the axial proppant momentum in the axial flow direction to account for proppant settling in another direction different from the axial flow direction.

13. The computer-readable medium of claim 8, wherein the momentum conservation model varies the axial proppant momentum to account for temperature evolution of the proppant-fluid mixture.

14. The computer-readable medium of claim 8, wherein the one-dimensional proppant transport flow model represents flow of the proppant-fluid mixture in at least one of a wellbore or a fracture in a subterranean rock formation.

15. A proppant transport flow modeling system comprising one or more computers that include:

a momentum conservation module operable to model proppant momentum in a one-dimensional proppant transport flow model, the one-dimensional proppant transport flow model representing flow of a proppant-fluid mixture in a subterranean region, the momentum conservation module operable to balance axial proppant momentum in an axial flow direction of the proppant-fluid mixture against dynamic changes in transverse proppant momentum, the momentum conservation model including a variable representing changes of a momentum of a proppant when the proppant settles into a bed of settled proppant and when the proppant becomes re-suspended from the bed of settled proppant into the proppant-fluid mixture;

a solver module operable to solve for a value of a flow variable based on the proppant momentum modeled by the momentum conservation module; and an injection control system operable to control an injection treatment in a well system by controlling a fluid parameter or a fracture treatment plan based on the value of the flow variable.

16. The proppant transport flow modeling system of claim 15, wherein the momentum conservation module is further operable to vary the axial proppant momentum to account for interphase momentum transfer between a proppant and a fluid of the proppant-fluid mixture during suspension and re-suspension of the proppant.

17. The proppant transport flow modeling system of claim 15, wherein the momentum conservation module is further operable to vary the axial proppant momentum in the axial flow direction to account for proppant settling in another direction different from the axial flow direction.

18. The proppant transport flow modeling system of claim 15, wherein the momentum conservation module is further operable to account for a bed height and settling velocity of the proppant in the proppant-fluid mixture.

19. The proppant transport flow modeling system of claim 15, wherein the one or more computers include a mass flux conservation module that conserves mass flux of the proppant-fluid mixture.

* * * * *